(12) United States Patent
Cruz et al.

(10) Patent No.: US 7,471,294 B1
(45) Date of Patent: Dec. 30, 2008

(54) GRAPHICAL REPRESENTATION OF ASYNCHRONOUS WEB SERVICE EXECUTION

(75) Inventors: Roderico Cruz, Tracy, CA (US); Christopher B. Webster, Dublin, CA (US); Todd Fast, San Francisco, CA (US); Matthew J. Stevens, Malvern, PA (US)

(73) Assignee: Sun Microsystems, Inc., Santa Clara, CA (US)

( * ) Notice: Subject to any disclaimer, the term of this patent is extended or adjusted under 35 U.S.C. 154(b) by 548 days.

(21) Appl. No.: 11/159,520

(22) Filed: Jun. 22, 2005

(51) Int. Cl.
*G06T 11/20* (2006.01)
(52) U.S. Cl. ........................... 345/440; 702/149
(58) Field of Classification Search ................. 345/619, 345/440, 473; 702/149
See application file for complete search history.

(56) References Cited

U.S. PATENT DOCUMENTS

| | | | |
|---|---|---|---|
| 5,812,049 A * | 9/1998 | Uzi | 340/323 R |
| 2004/0150215 A1 * | 8/2004 | King | 283/62 |

OTHER PUBLICATIONS

Nye, "X Protocol Reference Manual", 1995, O'Reilly & Associates, Inc., pp. 14-22.*
BEA Systems, Inc., "Getting Started with BEA WebLogic Workshop 8.1" *BEA WebLogic Workshop™ 8.1 (beta) JumpStart Guide* (2003) pp. 1-64.
Sun Microsystems, Inc., "Extending J2EE Applications with Web Services", *NetBeans IDE Field Guide* (2005) pp. 1-25.

* cited by examiner

*Primary Examiner*—Kee M Tung
*Assistant Examiner*—Michelle K Lay
(74) *Attorney, Agent, or Firm*—Martine Penilla & Gencarella, LLP (57) ABSTRACT

A method for visualizing web service interactions includes invoking a remote operation that causes a plurality of messages to be sent between two components in a connected system. The method further includes visually identifying a swim lane for each of the two components in a graphical display. For each message, a vector is plotted in the graphical display, where the vector extends from the swim lane of the message sender to the swim lane of the message recipient. The relative position of each vector depends on the time when the message was sent. A machine readable medium and an integrated development environment for representing asynchronous web service execution are also provided.

16 Claims, 9 Drawing Sheets

GRAPHICAL REPRESENTATION OF ASYNCHRONOUS WEB SERVICE EXECUTION

BACKGROUND

The term web services refers to various protocols and standards for exchanging data between applications in a platform-independent manner. Usually, web services refers to the exchange of extensible markup language (XML) formatted messages using the well-known SOAP protocol. The primary transport mechanism of these SOAP messages is the Hypertext Transport Protocol (HTTP) which is commonly used by web browsers and servers. However, the term web services, as used herein encompasses other protocols for exchanging data between connected systems.

A typical web services transaction is known as a remote procedure call (RPC) in which a client sends a request to a host. The host processes the request and sends a response with the results of the processing. The RPC is a useful mechanism for obtaining readily available information from a service provider. For example, a client may request a stock quote or a weather report and the host can then retrieve the requested information and return it to the client.

While RPC transactions are well suited for a variety of situations, there are many transactions for which the RPC is not suited. For example, there are many business problems requiring long-running transactions that cannot be adequately addressed by RPCs in web services. Long-running transactions are transactions that generally cannot be handled in real-time. For example, a client may request a sales or rental quote from a broker-server, which then must check rates and availability before returning with a result. In this case, the server will send a quick acknowledgement of the request, but may not return with a result for some time. In many cases, the request could initiate a complex series of messages between various service providers in an effort to gather the necessary information. These transactions are referred to as asynchronous conversational transactions. An interaction is said to be asynchronous when the associated messages are chronologically and procedurally decoupled. A Web service conversation involves maintaining some state information during a transaction involving multiple messages or participants.

Figure 1:
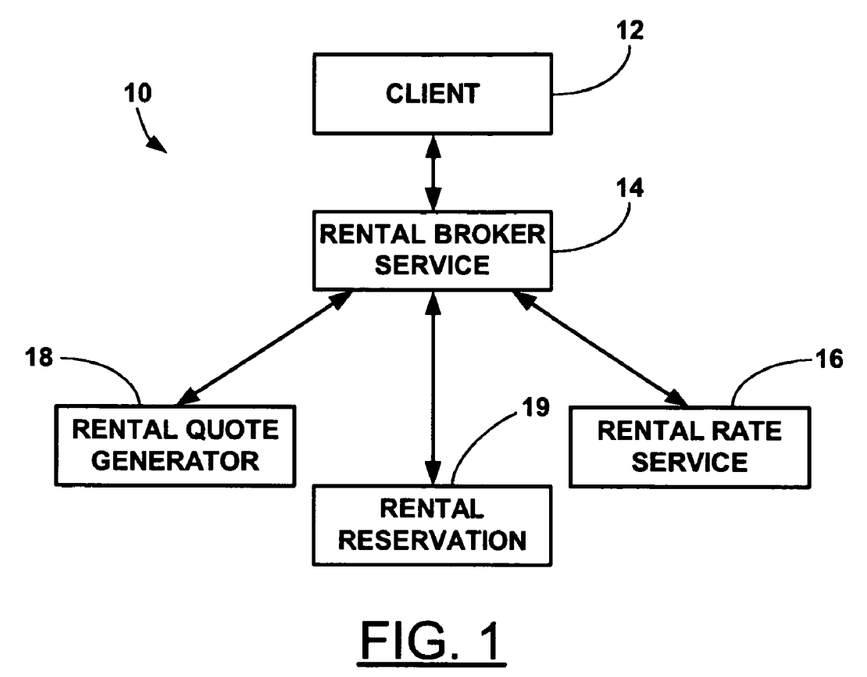
FIG. 1 shows a diagram depicting a plurality of service providers and a client in the context of a rental negotiation.

For example, FIG. 1 shows a diagram depicting a connected system 10 having plurality of service providers and a client in the context of a rental negotiation. In this example, client 12 may send a request for a quote to broker 14, which is a service provider. In response, the broker sends an immediate acknowledgement to client 12 and then requests rates from rental rate service 16. Rental rate service 16 responds with current rental rates. Broker 14 might then request a quote from quote generator 18 which responds with same. Broker 14, then finally sends a result of the quote request to client 12. Client 12 can reject or accept the quote. If rejected, the broker may repeat some operations and return with a better quote. If accepted, the broker may request a reservation from reservation service 19. Because the various service providers may retain information of the entities with whom it is communicating and the status of the communication, the transactions can be seen as asynchronous and conversational in nature.

Coding, testing, and debugging service provider applications handling asynchronous and conversational transactions can very tedious due to the complex and interconnected nature of the communications. To determine where a breakdown occurred, the programmer is required to review various trace files which contain the text of the messages being passed from one component to another, as well as correlate these messages with specific conversations. The programmer is required to read the trace files, which not necessarily designed to be readily understood by a human, and have knowledge of the interactions of the different components of the web service to identify the origin of the error, which may not be immediately apparent.

Integrated development environments (IDEs) have been developed to provide various tools to assist the programmer in coding and debugging software, however, these tools have not adequately addressed the problem of testing and debugging conversational transactions in web services. It would therefore be desirable to provide some mechanism to aid in the visualization of the messages being communicated among various service providers.

SUMMARY

Broadly speaking, the present invention fills these needs by providing a visualization tool for graphically representing web service execution.

It should be appreciated that the present invention can be implemented in numerous ways, including as a process, an apparatus, a system, a device, or a method. Several inventive embodiments of the present invention are described below.

In one embodiment, a method for visualizing web service interactions includes invoking an operation to cause a plurality of messages to be sent between a first component and a second component in a connected system. Each message has a sender and a recipient. The method further includes visually identifying a swim lane for each of the first and second components in a graphical display, and, for each of the messages, plotting a vector in the graphical display. The vector extends from the swim lane of a message sender to the swim lane of a message recipient and a relative position of each vector depends on the time a corresponding one of the messages is sent relative to other ones of the messages.

In another embodiment, a machine-readable medium having executable software embodied therein is configured to display a graphical representation of a web service interaction. The machine-readable medium comprises software instructions for receiving message traces in a connected system. Each of the message traces contains the content of a message sent from a sender of the message to a recipient of the message. The medium also includes software instructions for parsing the message traces to identify a sender and a receiver for each message and for visually identifying a swim lane for each component sending or receiving messages in the web service interaction in a graphical display. Furthermore, the medium includes software instructions that, for each message, plot a vector in the graphical display, the vector extending from a swim lane of a component that sent the message to a swim lane of a component that received the message. The vectors are plotted such that the relative position of each vector depends on a timestamp of the corresponding message relative to timestamps of other messages in the interaction.

In yet another embodiment, an integrated development environment (IDE) for developing and testing software applications is provided. The IDE comprises a computer application for performing a method comprising invoking an operation to cause a plurality of messages to be sent between a first component and a second component in a connected system, each message having a sender and a recipient. The method further comprises visually identifying a swim lane for each of the first and second components in a graphical display, and, for each of the messages, plotting a vector in the graphical display. Each vector extends from the swim lane of a message sender to the swim lane of a message recipient where a relative position of each vector depends on the time a corresponding one of the messages is sent relative to other ones of the messages.

The advantages of the visualization tool disclosed herein will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations have not been described in detail in order to avoid unnecessarily obscuring the invention.

Figure 2:
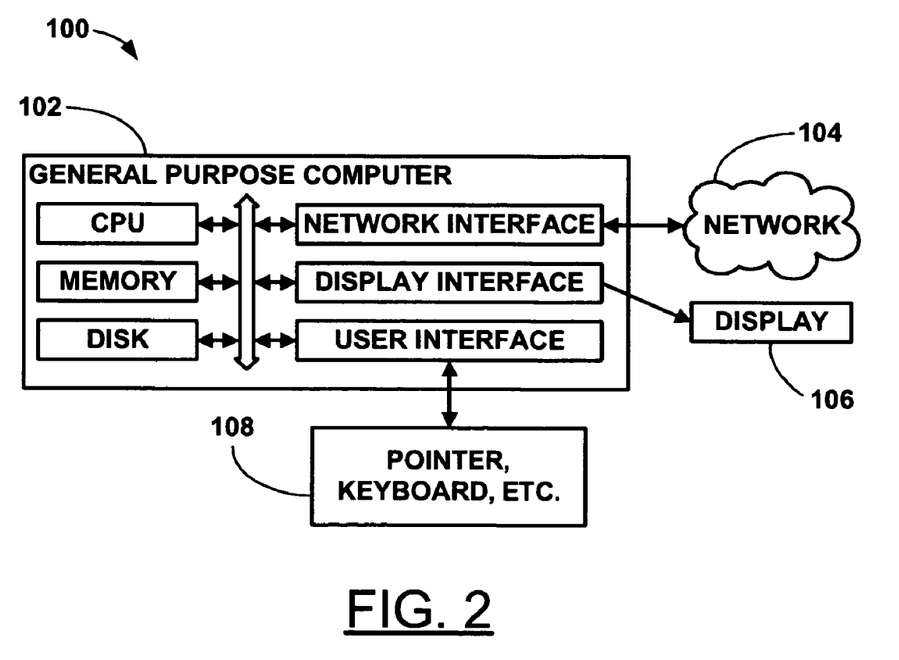
FIG. 2 shows an exemplary computer system for developing and testing software.

FIG. 2 shows an exemplary computer system 100 comprising a general purpose computer 102, network 104, graphical display 106 and user interface devices 108, which may include a mouse and keyboard or the like. Those skilled in the art will recognize that computer 102 includes a CPU, internal memory, internal disk storage, and interfaces for network 104, display 106 and interface devices 108. While a general purpose computer is shown here for exemplary purposes, it should also be understood that the visualization tool can be implemented in other ways, for example, in a distributed computing environment using a thin client.

In one embodiment, the visualization tool described herein is integrated into the NetBeans® integrated development environment (IDE) which is directed towards developing software using the Java® programming language developed by Sun Microsystems, Inc. The Netbeans® IDE provides a resource for web services developers to design a web service that may rely on a system of components or agents to achieve a particular function. Of course, the visualization tool can either be a standalone application or be integrated into another application.

Web services rely on messages sent from one agent to another and generally follow the pattern of a request and an acknowledgement or response. The message is the basic unit of communication between a web service and a requester in which data is communicated to or from a web service as a single logical transmission. Typically, the messages are transmitted over the Hypertext Transport Protocol (HTTP) as extensible markup language (XML) documents using the SOAP protocol. The SOAP protocol is a formal set of conventions governing the format and processing rules of a SOAP message and is maintained by the XML Protocol Working Group of the World Wide Web Consortium (W3C).

In addition, each web service provider generally requires needed information to be identified and formatted in a particular way which is by convention defined in a Web Services Description Language (WSDL) document. The Netbeans® IDE and other tools automate WSDL document generation and parsing.

To further assist the developer, the exemplary embodiment provides a visualization tool integrated into the Netbeens®IDE for visualizing the interaction between the client and various service providers. However, the visualization tool described herein should not be construed as being tied to a particular IDE or programming language. Furthermore, the visualization tool can be implemented for connected systems adhering to any paradigm. For example, the visualization tool can be implemented for protocols other than those mentioned above, e.g., distributed computing protocols such as the Common Object Request Broker Architecture (CORBA).

Figure 3:
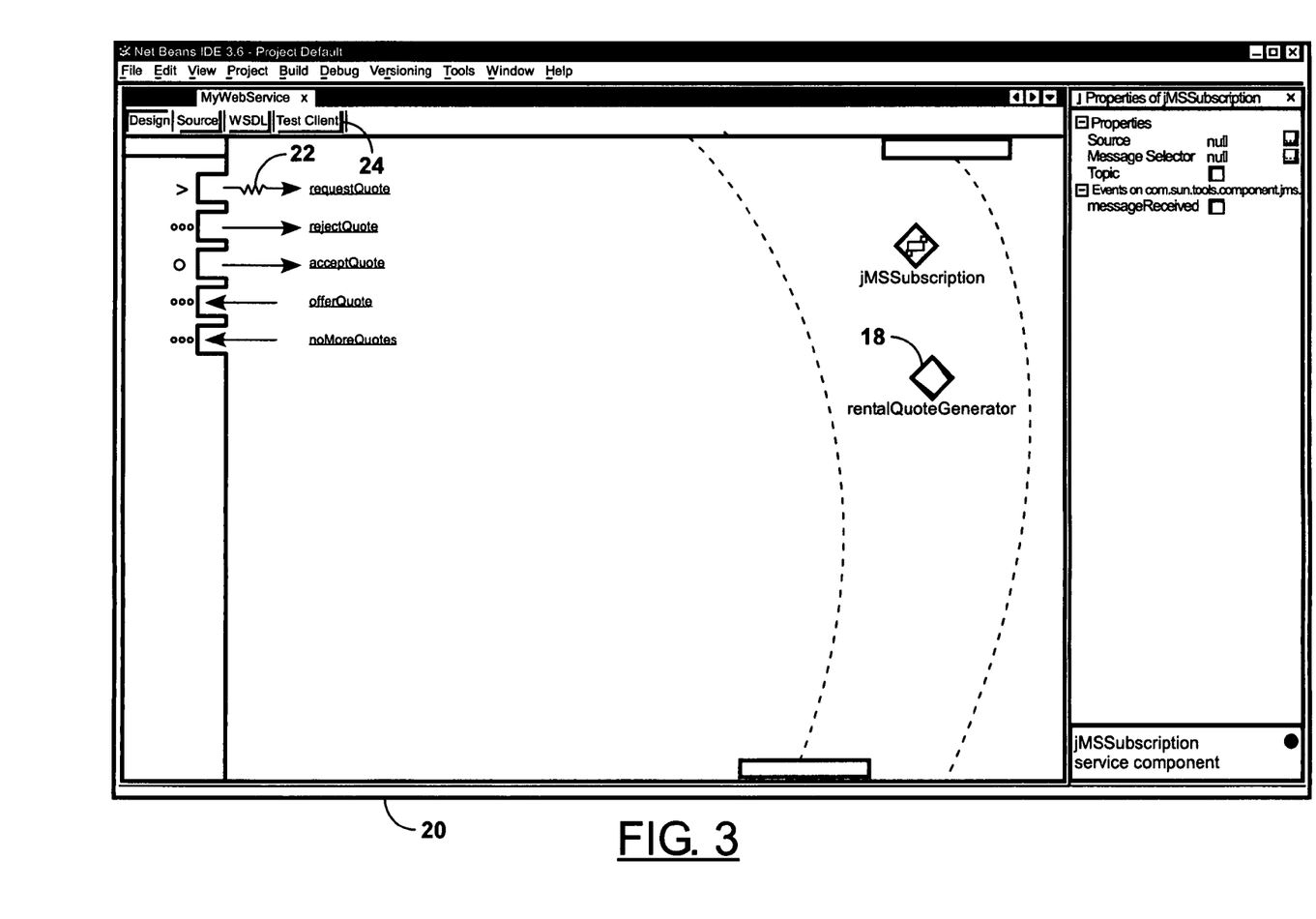
FIG. 3 shows an exemplary design view for implementing an auto rental broker service.

FIG. 3 shows a Netbeans® design view 20, implementing an auto rental broker service that performs three operations: requestQuote, rejectQuote, and acceptQuote. Each operation is invoked in response to a corresponding message from a client. The requestQuote operation is identified as being asynchronous by wavy arrow 22. Once the code is in place to handle the various messages, the user can test the code by clicking "Test Client" button 24. When the "Test Client" button 24 is clicked by a user, an input screen is displayed for entering parameters expected by the operation.

Figure 4:
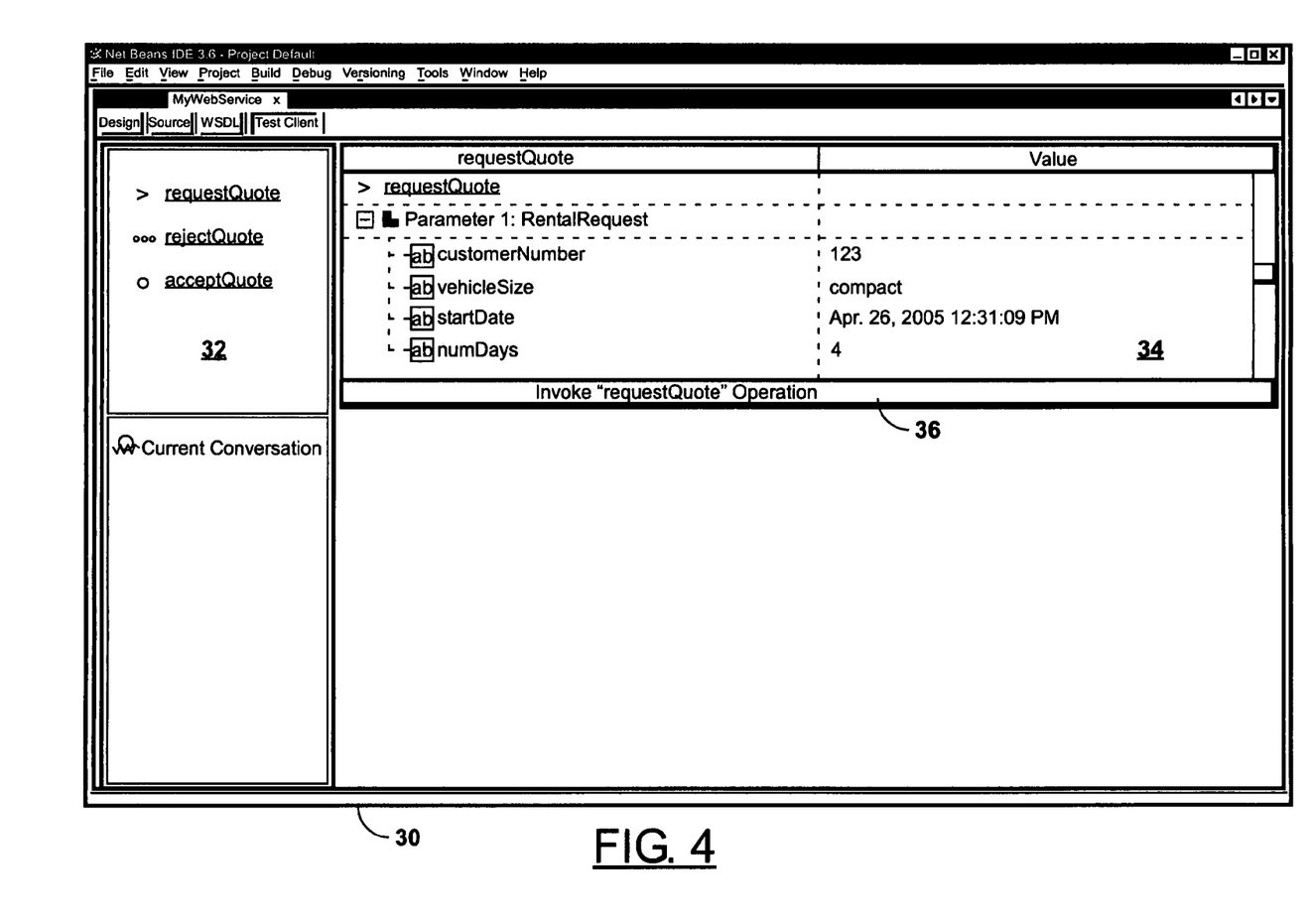
FIG. 4 shows an exemplary input screen for testing web service operations.

FIG. 4 shows an exemplary input screen 30 for testing web service operations. This screen allows the user to select an operation to invoke by clicking on one of the icons in operation list window 32. For example, when the requestQuote icon is clicked, parameter display 34 shows a list of arguments including their names and default values. The user at this point has an opportunity to modify the default values. These values are incorporated into a message sent to the component being tested. Thus, the operation of the client is emulated within the testing system to ensure the service responds as expected. When the user is ready to begin the test, invoke button 36 is clicked.

Figure 5:
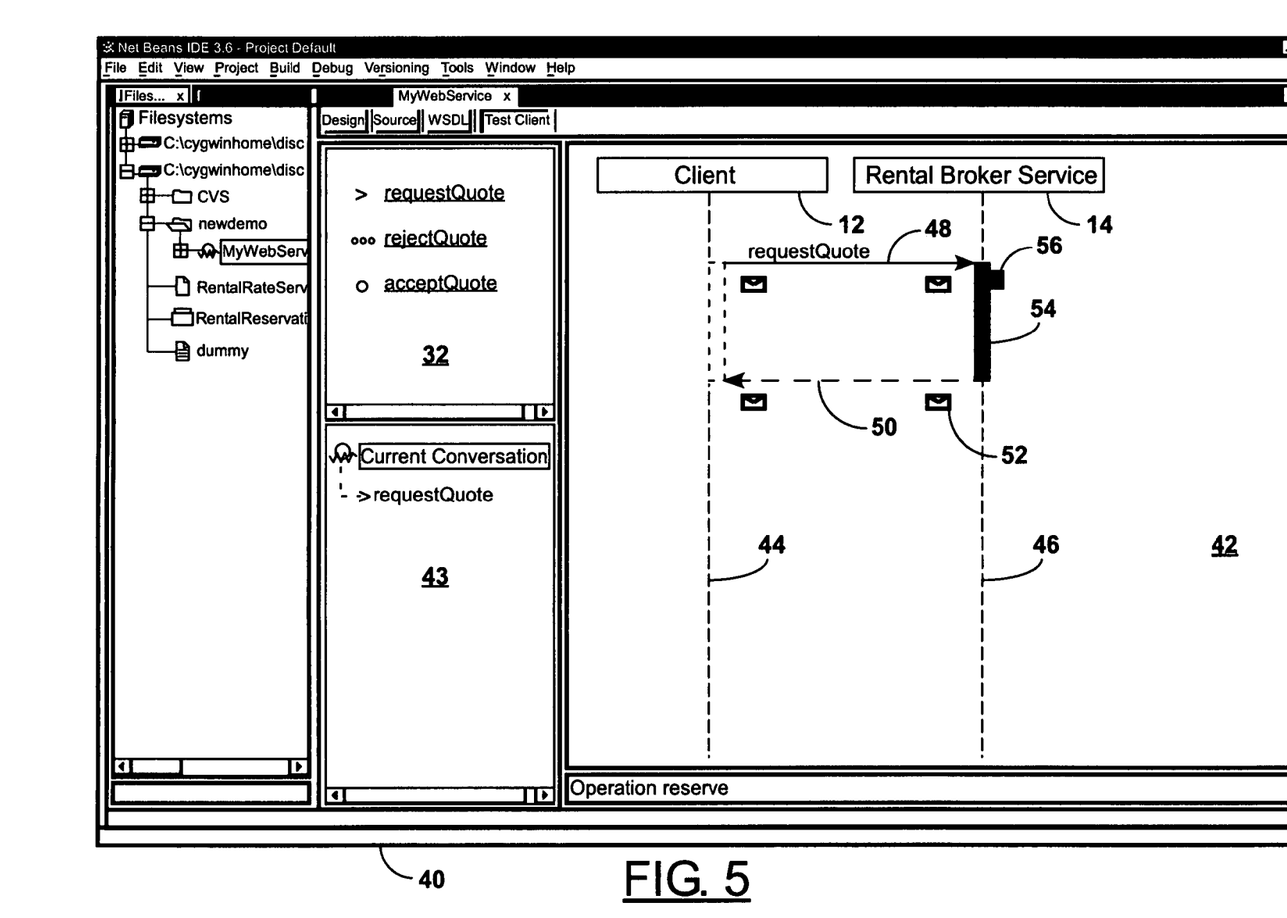
FIG. 5 shows an exemplary initial interaction page including a swim lane window.

FIG. 5 shows an exemplary initial interaction page 40 comprising an operation list window 32, a swim lane window 42 and a conversation navigator 43. Clicking on an operation name in operation list window 32 returns the user to input screen 30 (FIG. 4) to permit the user to invoke a new operation. Swim lane window 42 shows a swim lane for each component sending or receiving a message for the current conversation.

The message traces containing the contents of each message are logged during the interaction. These message traces are received and parsed to identify the sender and receiver of each message as well as a time stamp and other information. In one embodiment, the visualization tool uses the message traces to graphically display the interaction using the swim lane window.

In the exemplary embodiment, each swim lane is visually identified by a vertically oriented dashed line. In the example shown, this includes client swim lane 44 and a rental broker service swim lane 46. Thus, each swim lane represents a service provider or component involved in the web service which is identified at the top of the swim lane. A timeline-based rendering of the interactions is provided by plotting messages as vectors extending from the swim lane of a message sender to the swim lane of a message recipient where the position of the vector depends on the time the message is sent. The vectors may be represented by one of an arrow, graphical indicator, or a drawn connector line or icon. In the exemplary embodiment, vectors are represented by arrows that extend horizontally from one vertically-oriented swim lane to another, wherein messages sent later are positioned below earlier messages.

In one embodiment, request messages and response messages are distinguished from each other using different line styles. In the present example, request messages are indicated using a solid line while response messages are indicated using a dashed line. It is also possible to use different colored arrows or other means for visually distinguishing between a request and a response.

In exemplary initial interaction page 40, a requestQuote message 48 from client being sent to the rental broker service at a first moment in time, and, in response, an acknowledgement message 50 is sent from the rental broker service to the client at a second moment in time. Thus, each message exchange has a request arrow, from the requester to the provider, and a return arrow, from the provider to the requester.

At the start and end of each arrow are envelope icons 52 which, when clicked by the user, cause the contents of the message to be displayed in a separate window. For each message exchange, there are four envelope icons positioned at the four points of the interaction. At the tail of the request arrow is the requester dispatch. At the head of the request arrow is the provider receipt. At the tail of the return arrow is the provider dispatch and at the head of the return arrow is the requester receipt. Clicking any of these icons causes the contents of the corresponding message to be revealed in a separate window as shown and discussed in more detail below with reference to FIG. 7. A web service client will typically send a request (i.e., requester dispatch) contained in a SOAP message, while a web service may send a request to an internal component as plain text. Asynchronous interactions are represented by a gap between the immediate return from an asynchronous invocation and the continuation of the interaction.

Rectangle 54 extends along a service provider swim lane from receipt of a message to the transmission of a response. In one embodiment, the height of rectangle 54 is proportional to the execution time of the component. Block icon 56 indicates a queuing operation for the request. If the user clicks on block icon 56, then a message (not shown) indicates to the user what is being queued. This allows the user to ensure the service is properly handling the requests.

Figure 6:
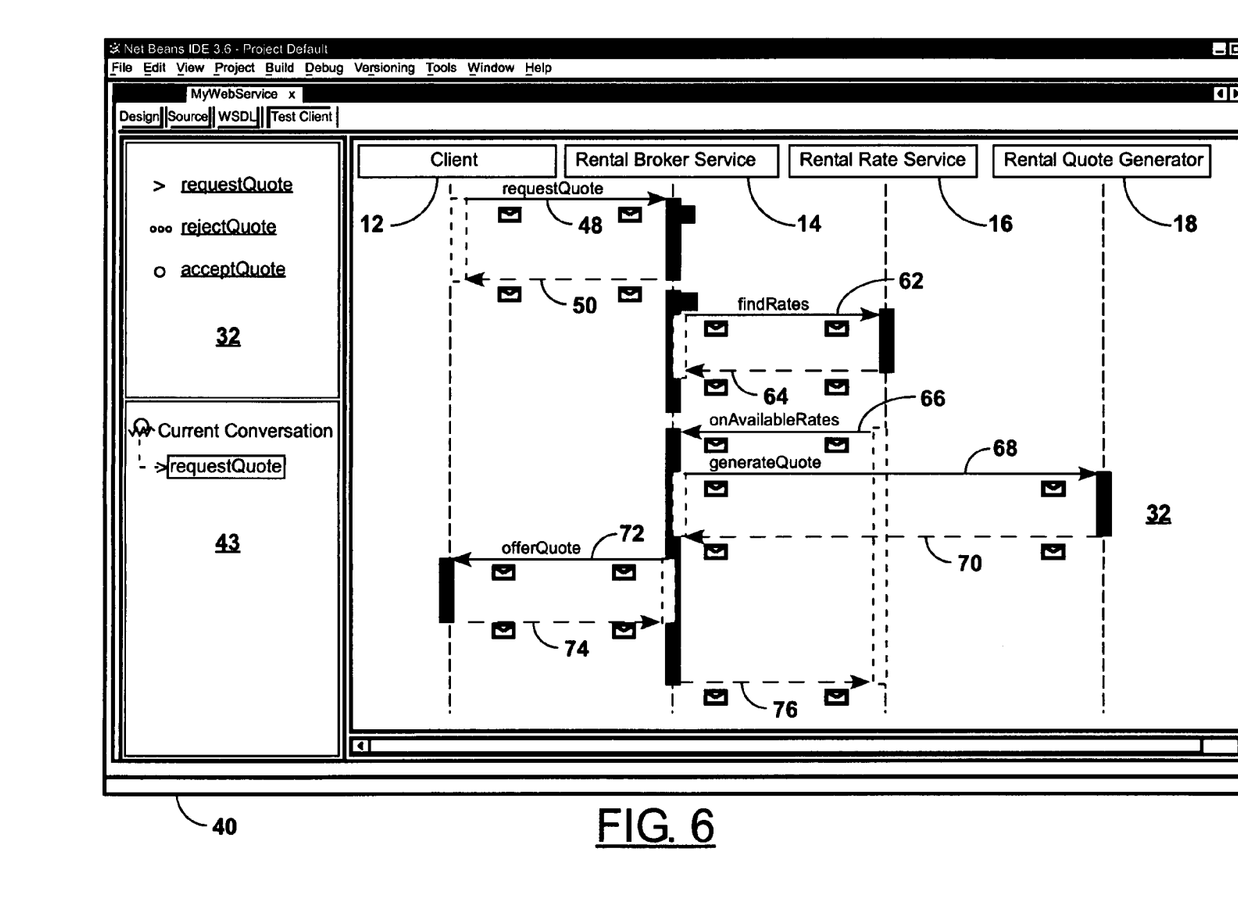
FIG. 6 shows swim lane window of FIG. 5 showing more of the interaction.

Thus, swim lane window 42 provides a visual representation of the interaction of the various components of the system during the testing thereof. FIG. 6 shows swim lane window 32 after clicking the requestQuote icon 61 at the bottom left of the screen several times, causing the system to step through the conversation to display more and more of the interaction. In the exemplary interaction, rental broker service 14 sends a findRates request 62 to rental rate service 16, which sends an immediate acknowledgement 64. At some later time, rental rate service 16 sends on AvailableRates message 66 to rental broker service 14, which causes rental broker service 14 to send generateQuote request 68 to rental quote generator 18, which is an internal component (as shown in FIG. 3). The rental quote generator 18 immediately responds with quote information via response 70. Rental broker service finally responds to initial requestQuote message 48 with offerQuote message 72. Client 12 sends an immediate acknowledgement 74 and rental broker service 14 acknowledges on AvailableRates message 66 with response 76.

This example of asynchronous conversational interaction is therefore clearly presented to the user with a clear view of the relationship among nested calls within the interaction and provides easy access to exact message contents. By visually presenting the information in an intuitive manner, the user is aided in quickly identifying any actual or potential problems with the interaction between the various components.

Figure 7:
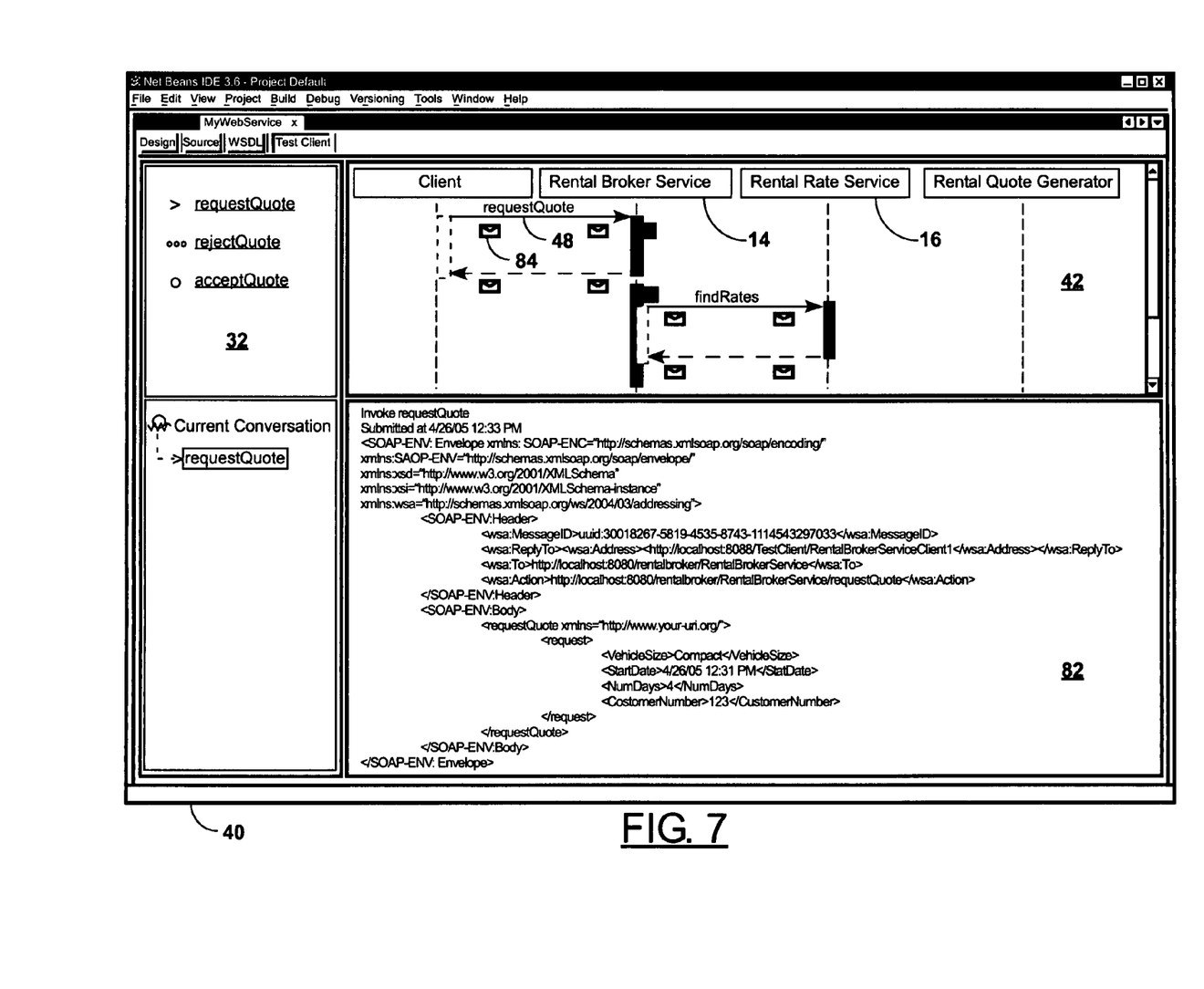
FIG. 7 shows the intraction page of FIG. 5 with the contents of a message in a message view window.

FIG. 7 shows the exemplary interaction with the contents of the requestQuote message in message view window 82. The message contents are displayed when envelope icon 84 adjacent the requestQuote message 48 is clicked by the user.

Figure 8:
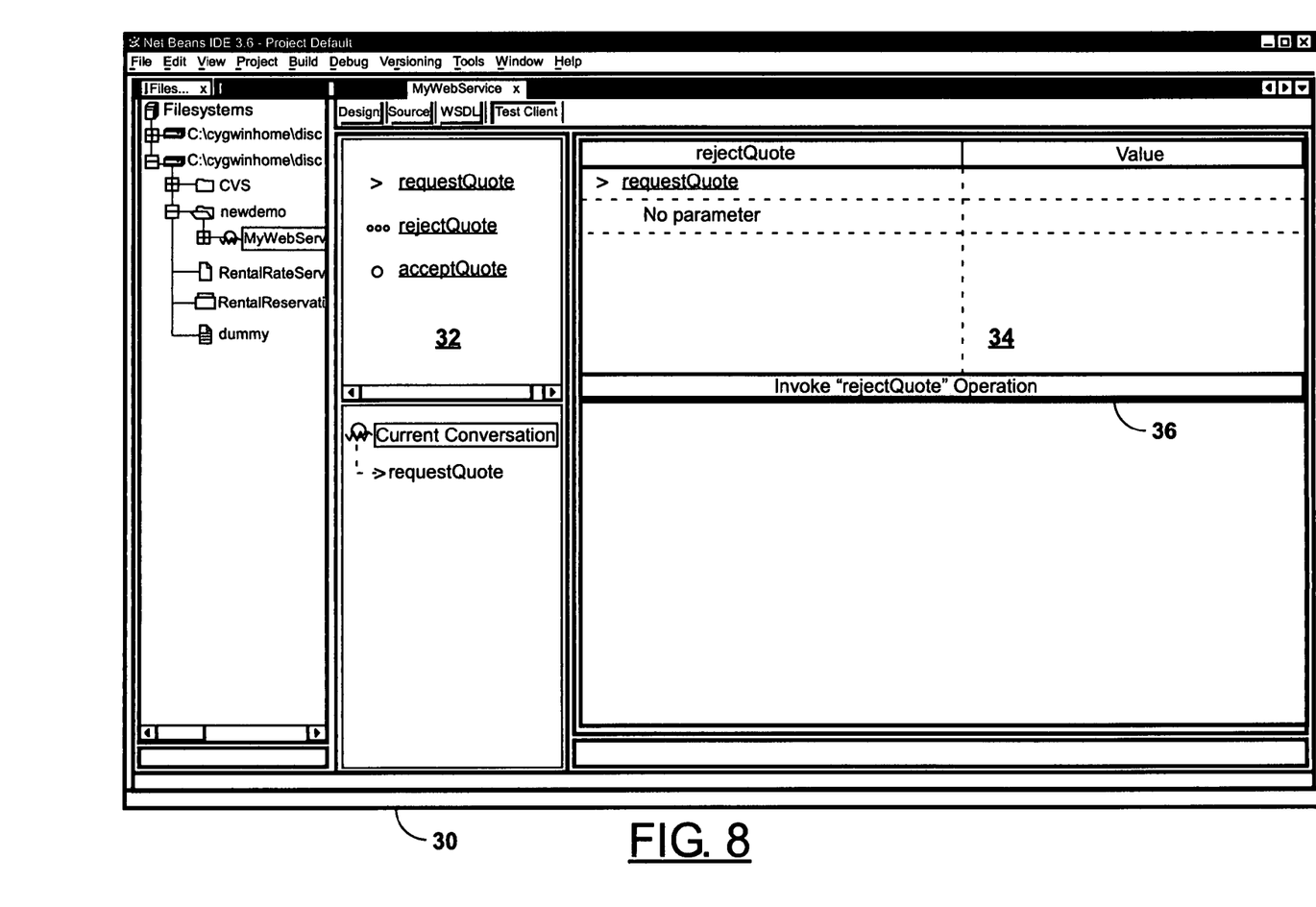
FIG. 8 shows the input screen of FIG. 4 after the user selects a new operation.

FIG. 8 shows input screen 30 after the user selects the rejectQuote operation from operations list 32. Since the rejectQuote operation does not have any parameters, none are listed in parameter display 34. The operation is then invoked by clicking invoke button 36. Other selection operations are also possible, so long as the invoking is caused to occur.

Figure 9:
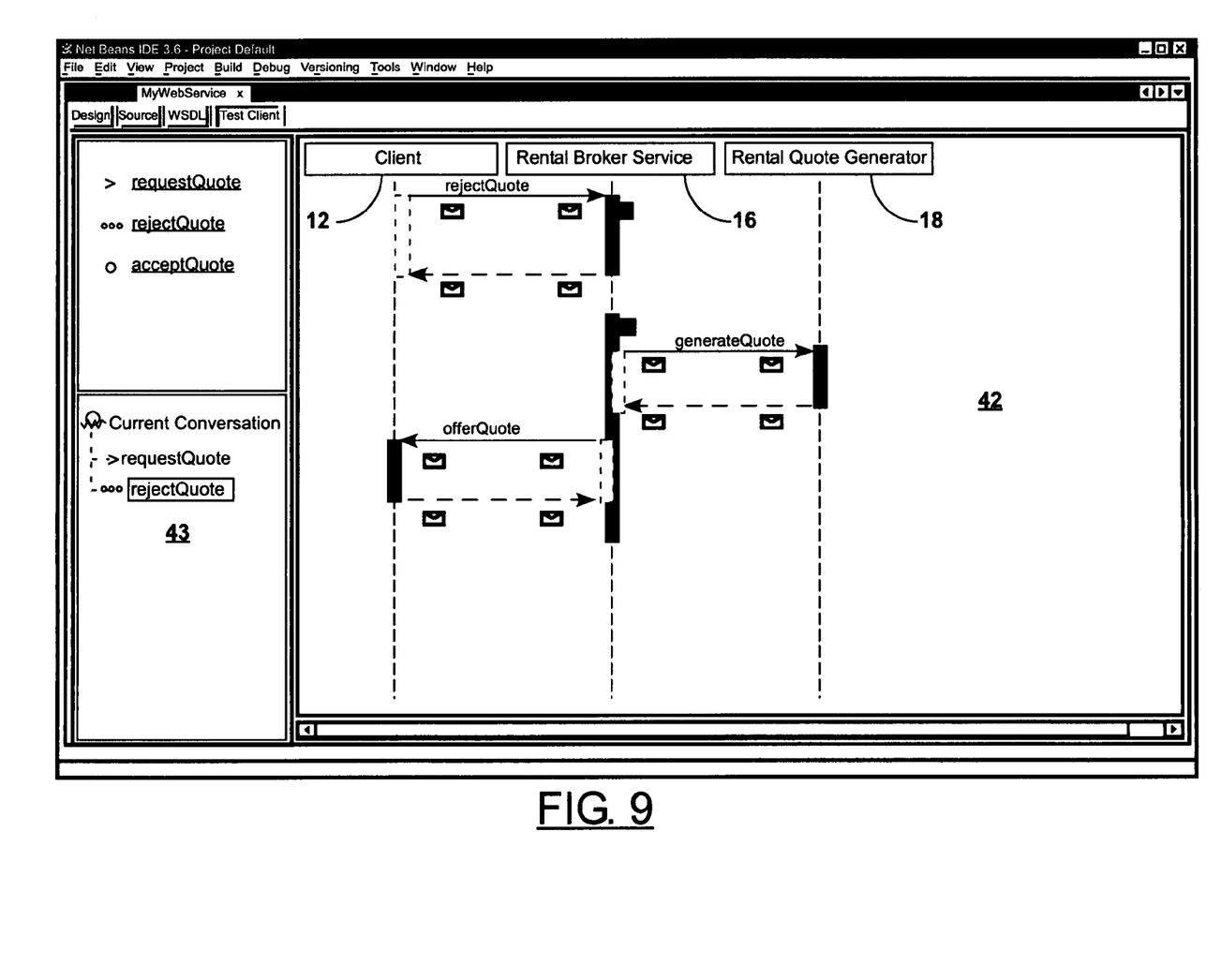
FIG. 9 shows the interaction page after invoking the new operation of FIG. 8.

FIG. 9 shows the interaction resulting from the rejectQuote operation. In this case, rental broker service messaged rental quote generator to obtain a new quote which is then offered to client 12. In conversation navigator 43, the "rejectQuote" icon is highlighted, indicating that the interaction related to the rejectQuote operation is being displayed. The user can click on "Current Conversation" in the conversation navigator 43 to display the entire conversation, which in this example, includes the interaction for the requestQuote and rejectQuote operations.

Figure 10:
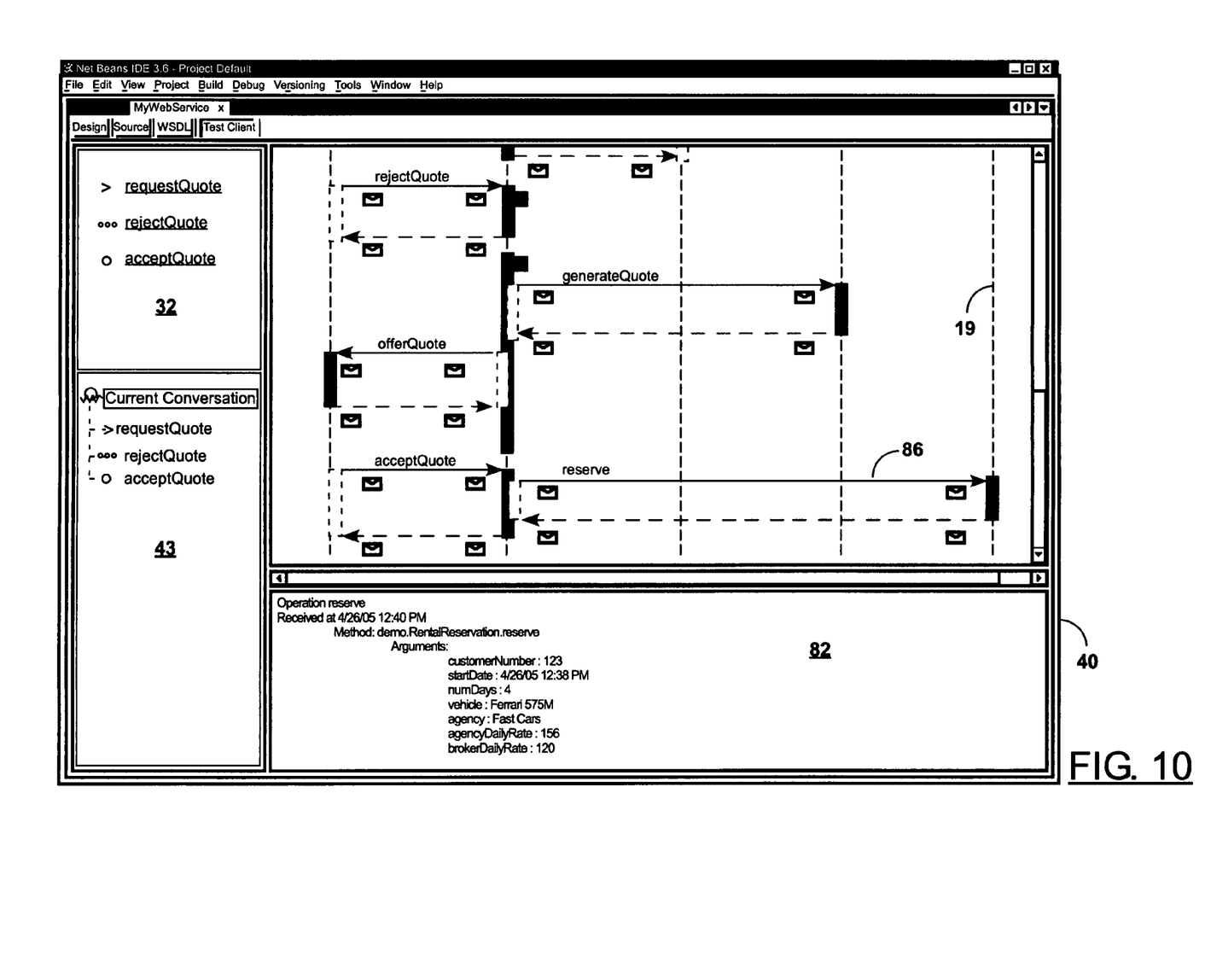
FIG. 10 shows the completed conversation after executing three operations.

FIG. 10 shows the completed conversation with the contents of reserve message 86. Since the message is coming from a local component, it is not encoded in XML.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for visualizing web service interactions, the method comprising:
    invoking an operation to cause a plurality of messages to be sent between a first component and a second component in a connected system, each message having a sender and a recipient;
    visually identifying a swim lane for each of the first and second components in a graphical display;
    for each of the messages, plotting a vector in the graphical display, the vector extending from the swim lane of a message sender to the swim lane of a message recipient where a relative position of each vector depends on the time a corresponding one of the messages is sent relative to other ones of the messages;
    displaying a first icon at an end of each vector that indicates the sender of a corresponding message;
    displaying a second icon at an end of each vector that indicates the recipient of the corresponding message;
    displaying contents of a message dispatch when the first icon is selected; and
    displaying contents of a message receipt when the second icon is selected.

2. The method of claim 1, wherein each vector is represented by one of an arrow, graphical indicator, or a drawn connector line or icon.

3. The method of claim 1, wherein the swim lanes are oriented vertically and the vectors extend horizontally; the vectors corresponding to later messages being positioned below vectors corresponding to earlier messages.

4. The method of claim 1, wherein the plurality of messages comprise at least a pair of messages, each pair comprising a request message and a response message, wherein for the pair, the response message is sent from the recipient of the request message to the sender of the request message, the method further comprising:
    visually distinguishing the request message from the response message.

5. The method of claim 4, wherein the visually distinguishing is performed by one of drawing a response message vector using one of a different line style or color than a request message vector.

6. The method of claim 1, further comprising:
    displaying an icon adjacent each vector; and
    displaying a contents of a corresponding message when the icon is selected.

7. The method of claim 6, wherein contents of the corresponding message is displayed in a separate window.

8. A method for visualizing web service interactions, the method comprising:
    invoking an operation to cause a plurality of messages to be sent between a first component and a second component in a connected system each message having a sender and a recipient;
    visually identifying a swim lane for each of the first and second components in a graphical display;
    for each of the messages, plotting a vector in the graphical display, the vector extending from the swim lane of a message sender to the swim lane of a message recipient where a relative position of each vector depends on the time a corresponding one of the messages is sent relative to other ones of the messages, wherein the plurality of messages comprise an interaction which is triggered by invoking the operation;
    displaying a conversation navigator listing a plurality of interactions by a name of a corresponding operation;
    displaying each interaction by selecting the corresponding name in the conversation navigator; and
    displaying an entire conversation formed from a plurality of interactions by selecting a corresponding icon in the conversation navigator.

9. The method of claim 8 wherein the method further comprises:
    displaying an icon adjacent each vector; and
    displaying a contents of a corresponding message when the icon is selected.

10. The method of claim 8 wherein the method further comprises:
    displaying a first icon at an end of each vector that indicates the sender of a corresponding message;
    displaying a second icon at an end of each vector that indicates the recipient of the corresponding message;
    displaying contents of a message dispatch when the first icon is selected; and
    displaying contents of a message receipt when the second icon is selected.

11. A machine-readable medium having executable software embodied therein, the software being configured to display a graphical representation of a web service interaction, the machine-readable medium comprising:
    software instructions for receiving message traces in a connected system, each of the message traces containing the content of a message sent from a sender of the message to a recipient of the message;
    software instructions for parsing the message traces to identify a sender and a receiver for each message;
    software instructions for visually identifying a swim lane for each component sending or receiving messages in the web service interaction in a graphical display;
    software instructions that, for each message, plots a vector in the graphical display, the vector extending from a swim lane of a component that sent the message to a swim lane of a component that received the message, wherein the relative position of each vector depends on a timestamp of the corresponding message relative to timestamps of other messages in the interactions;
    software instructions for displaying a first icon at an end of each vector that indicates the sender of a corresponding message;
    software instructions for displaying a second icon at an end of each vector that indicates the recipient of the corresponding message;
    software instructions for displaying contents of a message dispatch when the first icon is selected; and
    software instructions for displaying contents of a message receipt when the second icon is selected.

12. The machine readable medium of claim 11, wherein each vector is represented by one of an arrow, graphical indicator, or a drawn connector line or icon.

13. The machine readable medium of claim 11, wherein each swim lane is oriented vertically and each vector extends horizontally; the vectors corresponding to later messages being positioned below vectors corresponding to earlier messages.

14. The machine readable medium of claim 11, wherein each message trace corresponds to one of a request message and a response message, wherein the software instructions for plotting a vector further comprises software instructions for visually distinguishing vectors corresponding to request messages from vectors corresponding to response messages.

15. The machine readable medium of claim 14, wherein vectors corresponding to request messages are drawn using a one of a different line style or color than vectors corresponding to response messages.

16. The machine readable medium of claim 11, further comprising:
- software instructions for displaying an icon adjacent to each vector; and
- software instructions for displaying contents of the trace corresponding to the vector when the icon is selected.

* * * * *